United States Patent [19]
Mayfield

[11] Patent Number: 5,201,539
[45] Date of Patent: Apr. 13, 1993

[54] ACTUATING MECHANISM FOR A HITCH GUIDANCE SYSTEM

[75] Inventor: Robert L. Mayfield, Cedar Falls, Iowa

[73] Assignee: Deere & Company, Moline, Ill.

[21] Appl. No.: 762,198

[22] Filed: Sep. 19, 1991

[51] Int. Cl.⁵ .................. B60D 1/00; A01B 59/043
[52] U.S. Cl. .................. 280/479.2; 280/474; 280/456.1; 172/450; 172/439; 172/667
[58] Field of Search .................. 280/477, 478.1, 479.2, 280/479.1, 479.3, 474, 515, 460.1, 461.1, 462, 463, 456.1; 172/446, 450, 439, 667, 317, 324

[56] References Cited

U.S. PATENT DOCUMENTS

| | | | |
|---|---|---|---|
| 3,098,528 | 7/1963 | Richey et al. | 172/439 |
| 3,197,239 | 7/1965 | Jezek, Jr. | 280/515 |
| 3,425,715 | 2/1969 | Weitz | 280/479.1 |
| 3,530,943 | 9/1970 | Taylor | 172/667 |
| 4,360,216 | 11/1982 | Wiemers | 280/479.1 |
| 4,470,613 | 9/1984 | Sykes | 172/450 |
| 4,601,486 | 7/1986 | Marcq | 172/450 |
| 4,616,712 | 10/1986 | Jorgensen | 172/6 |
| 4,640,365 | 2/1987 | Schmidt | 172/26 |
| 4,790,557 | 12/1988 | Klingler | 172/450 |
| 4,835,691 | 5/1989 | Rotem et al. | 364/424.02 |
| 4,930,581 | 6/1990 | Fleischer et al. | 172/6 |

OTHER PUBLICATIONS

Sunco Aura Trak Literature.
Sukup Autoguide Guidance System Literature.
Orthman MP-III Tracker Literature.
Navigator Row Crop Guidance System Literature.
Scout Literature.
The Guide Quick Hitch Literature.
Orthman Computerized Quick Hitch Guidance System Literature.
TRI-R Innovations Inc., The Robotic Driver.

*Primary Examiner*—Russell D. Stormer
*Assistant Examiner*—Florian Zeender

[57] ABSTRACT

A hitch guidance mechanism for an agricultural vehicle having a pair of movable draft links for coupling to an implement and having a pair of brackets attached to the rear end of a frame of the vehicle. The brackets are positioned above and on opposite sides of a PTO shaft which projects from the frame. Pivot arms are pivotally suspended from the brackets. Left and right sway block supports are pivotally coupled to the lower ends of the pivot arms. The sway block supports are rigidly interconnected to each other by a rectangular plate and an adjustable length rod. A pair of sway blocks slidably engage the draft links and are adjustably fixable to the sway block supports. An actuator is coupled between the frame and one of the sway block supports for controlling lateral movement of the sway block supports, the sway blocks and the draft links.

13 Claims, 3 Drawing Sheets

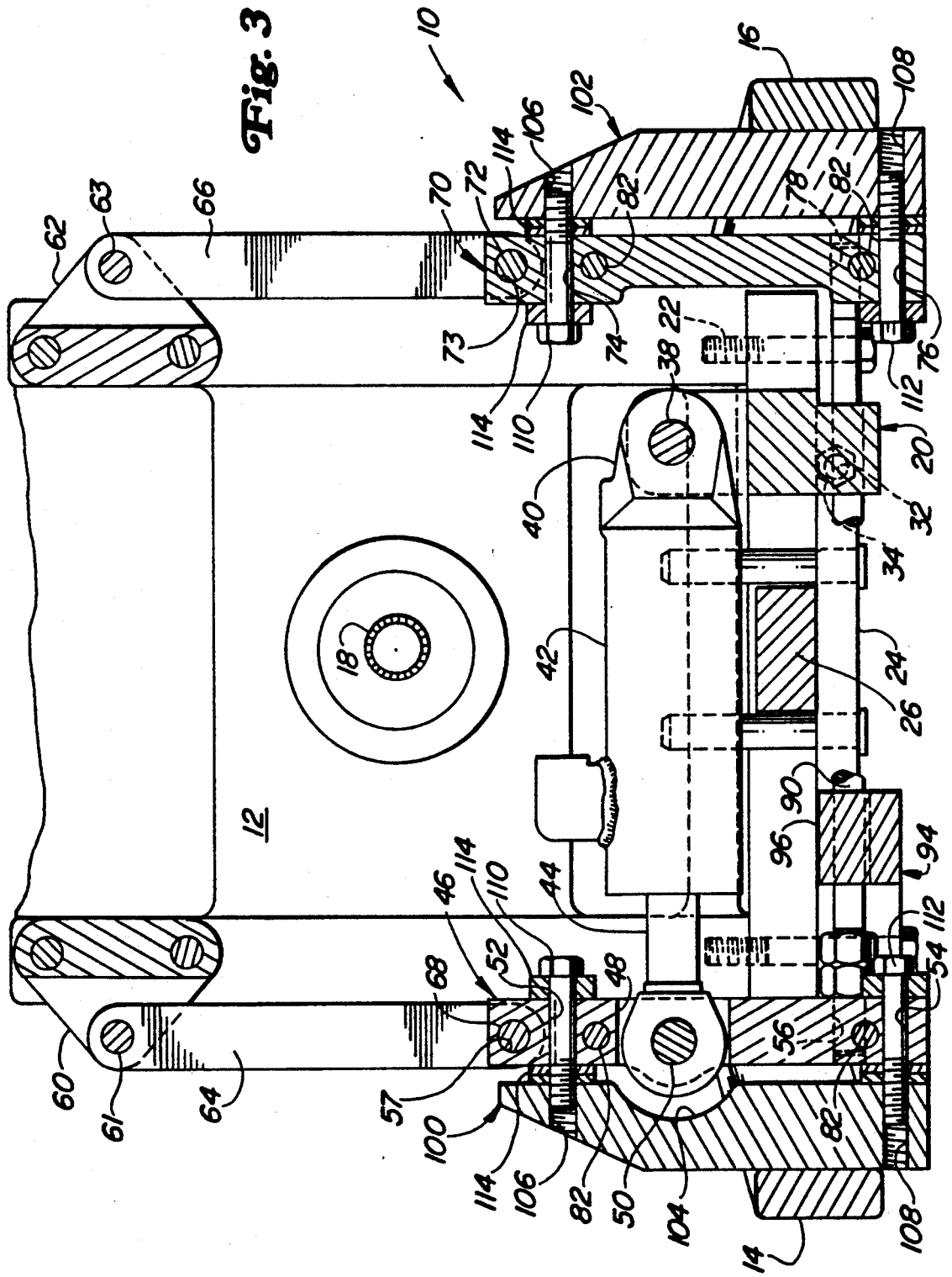

ACTUATING MECHANISM FOR A HITCH GUIDANCE SYSTEM

BACKGROUND

This invention relates to an actuating mechanism for a guidance system which moves an implement hitch from side to side.

Various implement guidance systems are commercially available. These systems move the implement or the hitch from side to side to keep the implement accurately on the row for planting and cultivating. The purpose of these systems is to reduce crop damage, reduce operator fatigue, allow faster tractor operation, and closer, more precise cultivation. However, many of these systems have actuating mechanisms which interfere with use of the existing hitch quick coupler and move the implement further rearward. Many such systems have to be removed from the tractor when non-guided implements are attached to the hitch. Some such systems cannot be used unless an expensive special quick coupler is attached to the rear of the hitch. This adds a significant amount of weight behind the tractor thus degrading tractor stability and preventing full utilization of the tractor's hitch lift capacity. Many such systems also interfere with the normal operation of the PTO, hitch, or drawbar.

SUMMARY

An object of the present invention is to provide a simple actuating mechanism for a guidance system which moves an implement hitch from side to side.

Another object is to provide such an actuating mechanism which does not interfere with use of an existing hitch quick coupler and which does not move the implement further rearward.

Another object is to provide such an actuating mechanism which does not have to be removed from the tractor when non-guided implements are attached to the hitch.

A further object of the present invention is to provide such an actuating mechanism which does not require an expensive special quick coupler to be attached to the rear of the hitch.

A further object of the present invention is to provide such an actuating mechanism which does not add a significant amount of weight behind the tractor, and thus does not degrade tractor stability and prevent full utilization of the tractor's hitch lift capacity.

A further object of the present invention is to provide such an actuating mechanism which allows an operator to power the hitch from side to side to precisely align the hitch with an implement to make easier the task of coupling an implement to the hitch.

A further object of the present invention is to provide a simple sway control mechanism with which the operator can lock the hitch in a rigid position or allow the hitch to sway freely from side to side.

Finally, an object of the present invention is to provide such an actuating mechanism which does not interfere with the normal operation of the PTO, hitch, or drawbar.

These and other objects are achieved by the present invention wherein an agricultural tractor has a conventional hitch assembly having a pair of movable draft links for coupling to an implement. The hitch guidance actuating mechanism of the present invention includes a pair of pivot brackets mounted on the rear of the tractor PTO housing above and to either side of the PTO shaft. A pair of arms hang down from the brackets. The arms are pivotally coupled to corresponding left and right sway block supports which are rigidly interconnected by a plate and an adjustable length rod. The sway block supports are adjustably, but rigidly coupled to corresponding sway blocks, each of which slidably engages one of the draft links. A double acting hydraulic cylinder has a housing end pivotally fixed to the PTO housing and a piston rod pivotally coupled to one of the sway block supports. As the cylinder extends or retracts it moves to the left or right the rigid unit comprising the sway block supports, the sway blocks, the plate and the rod. In turn, the sway blocks move the draft links to the left or to the right to guide an implement connected thereto.

BRIEF DESCRIPTION

FIG. 3 is a rear sectional view along lines 3—3 of FIG. 2.

DETAILED DESCRIPTION

Figure 1:
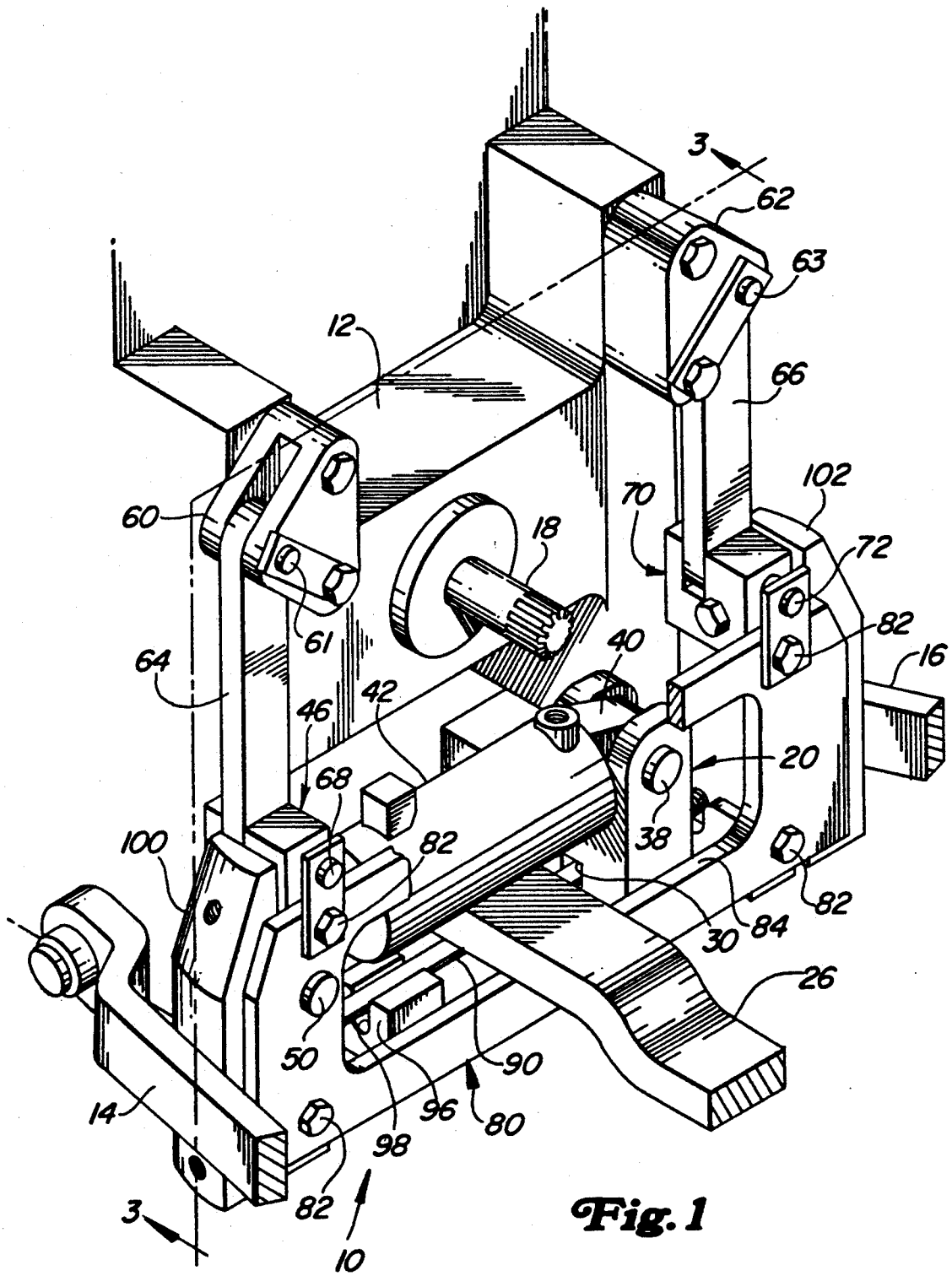
FIG. 1 is a perspective view of an actuating mechanism for a hitch guidance system according to the present invention.

As best seen in FIG. 1, the hitch guidance system actuating mechanism 10 of the present invention is mounted on the power-take-off (PTO) housing 12 which is located at the rear of the tractor (not shown) above and between the draft links 14 and 16 of a conventional three point implement hitch mechanism (not shown). A conventional PTO shaft 18 projects rearward from the housing 12.

Figure 2:
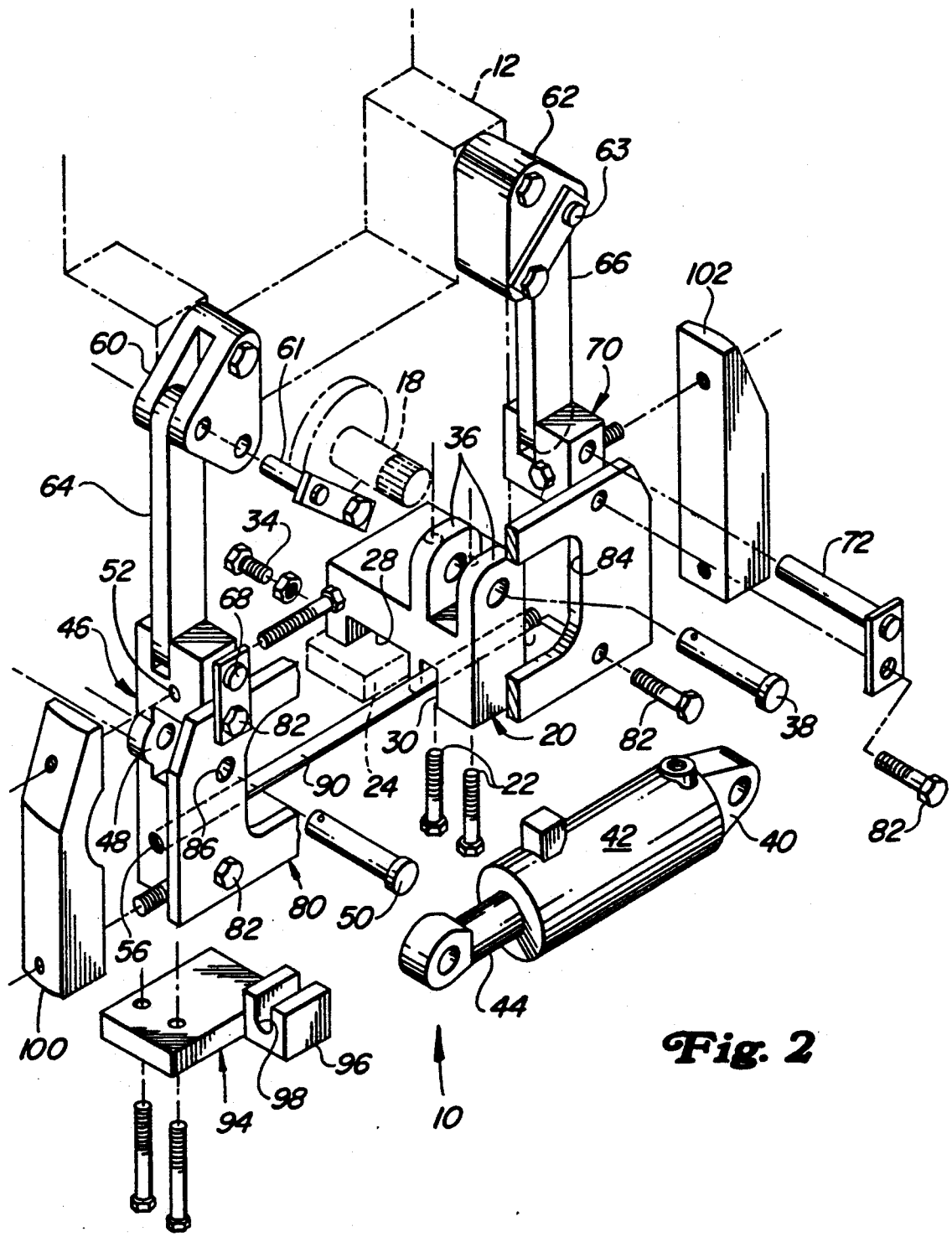
FIG. 2 is an exploded perspective view of the actuating mechanism of the present invention.

The actuating mechanism 10 includes a bracket 20 which is bolted to the housing 12 by bolts 22, preferably between the housing 12 and the conventional drawbar support 24 which supports the drawbar 26. As best seen in FIGS. 2 and 3, the bracket 20 includes a larger downwardly opening, laterally extending channel 28 and a smaller downwardly opening, laterally extending slot 30. Channel 28 receives the drawbar support 24. A threaded bore 32 extends through part of the bracket 20 and opens into the channel 28. A bolt or cap screw 34 is installed in bore 32 so that the bracket 20 may be clamped onto the drawbar support 24. The bracket 20 also includes a pair of upwardly projecting pivot arms 36 which receive pivot pin 38 which pivotally couples the bracket 20 to the housing end 40 of a double acting hydraulic cylinder 42.

A piston rod 44 projects from the rod end of the cylinder 42. The piston rod 44 is pivotally coupled to a left sway block support 46. The left sway block support 46 has a central recess 48 for receiving a coupling part of the rod 44 via a pivot pin 50, upper and lower laterally extending bores 52,54, a laterally extending threaded bore 56 located beneath recess 48 and a pivot pin bore 57. Left and right pivot brackets 60,62 are fixed to the housing 12 above and to either side of the PTO shaft 18. Pivot brackets 60,62 pivotally support via pins 61,63 left and right pivot arms 64,66 which hang generally downwardly therefrom. The left pivot arm 64 is pivotally coupled to the top of the left sway block support 46 by pin 68 which is received in bore 57.

The right pivot arm 66 is pivotally coupled to the top of a right sway block support 70 by pin 72 received in bore 73. The right sway block support 70 includes upper and lower laterally extending bores 74,76 and a laterally extending threaded bore 78 located slightly above lower bore 76.

As best seen in FIGS. 1 and 2, a generally rectangular plate 80 is attached to the rear sides of the left and right sway block supports 46,70, preferably by four bolts 82 which are received by corresponding threaded bores in the sway block supports. The plate 80 has a central opening 84 through which extends the drawbar 26. The plate 80 also has a bore 86 through which extends the pin 50. The plate 80 holds the sway block supports 46,70 in parallel alignment to each other a fixed distance apart. An adjustable length rod 90 couples the left sway block support 46 to a right sway block support 70 by means of threaded ends which are received in the threaded bores 56 and 78.

As best seen in FIGS. 1 and 2, small appertured plates are welded to the heads of pins 68 and 72. These appertured plates receive corresponding ones of the bolts 82 so that the pins 68 and 72 will be held in place. Similar bolted plates are provided for pins 61 and 63.

A guide member 94 is bolted to a portion of the bottom of housing 12 near the left sway block support 46. The guide member 94 supports a guide part 96 which has a laterally extending, upwardly opening slot 98 therein. The slot 98 and the slot 30 slidably receive the rod 90 and the walls of these slots engage the rod 90 to prevent the fore-and-aft movement of the lower parts of the actuating mechanism 10.

A left sway block 100 is positioned between the left sway block support 46 and the left draft link 14, and a right sway block 102 is positioned between the right sway block support 70 and the right draft link 16. The left sway block 100 includes a rounded recess 104 which accommodates the rounded end of the cylinder rod 44. Each of the sway blocks 100,102 has laterally extending upper and lower threaded bores 106,108. Each of the sway blocks 100,102 is coupled to a corresponding one of the sway block supports 46,70 by an upper bolt 110 and a lower bolt 112. The upper bolts 110 extend through bores 52, 74 and are screwed into upper threaded bores 106. The lower bolts 112 extend through bores 56, 78 and are screwed into lower threaded bores 108. As best seen in FIG. 3, the bolts 110,112 have a length so that they project inwardly from the sway blocks 100,102 by a distance which is substantially longer than the lateral dimension of the sway block supports 46,70. A plurality of shims 114 may be placed on the bolts 110,112, between each sway block support and the corresponding sway blocks and/or between the sway block supports 46,70 and the heads of the bolts 110,112. By moving the shims 114 around and then tightening the bolts 110,112, the sway blocks 100,102 can be rigidly held apart with varying amounts of lateral spacing therebetween. This adjusts the lateral spacing of the draft links 14,16 in order to accommodate implements of varying dimensions and to compensate for wear in the sway blocks 100,102. During assembly, the length of the rod 90 is shortened until the assembly comprising both sway block supports 46,70, both sway blocks 100,102 and the plate 80, forms a rigid unit. As best seen in FIG. 1, this rigid unit is positioned immediately adjacent to the rear of the housing or frame 12 and is located generally between the draft links 14,16 and is spaced apart forward of the aft ends (not shown) of the draft links 14,16. Also as best seen in FIG. 1, this rigid unit has a central open space through which projects the drawbar 26. This permits the actuating mechanism 10 to be installed on a tractor with a convention 3-point hitch without the attachment of an expensive and heavy special quick coupler to the aft ends of the draft links.

During operation, pressurized hydraulic fluid is directed to the cylinder 24 to cause it to extend or retract, as appropriate. This in turn, causes the rigid unit comprising both sway block supports 46,70, both sway blocks 100,102 and the plate 80 to swing to left or right as the pivot arms 64,66 pivot about pins 61,63. In turn, the sway blocks 100,102 engage the left draft link 14 or the right draft link 16 and move the draft links to the left or to the right. The actuating mechanism 10 could function in combination with various commercially available row guidance sensing and control systems such as the "Auto Guide Row Crop Sensing System", manufactured by Sukup Manufacturing Company, the "Navigator Row Crop Sensing System" manufactured by HR Manufacturing Company, or the "MP-III Automatic Guidance System" manufactured by Orthman Manufacturing, Inc, or other similar commercially available systems.

With the addition of an appropriate valve, the actuating mechanism 10 could function to power the hitch from side to side to precisely align the hitch with an implement to make easier the task of coupling an implement to the hitch. It could also function as a simple sway control mechanism with which the operator could lock the hitch in a rigid position or allow the hitch to sway freely from side to side.

While the invention has been described in conjunction with a specific embodiment, it is to be understood that many alternatives, modifications and variations will be apparent to those skilled in the art in light of the foregoing description. For example, the single rodded cylinder could be replaced with a double rodded cylinder having a cylinder housing anchored to the tractor housing and with each rod coupled to one of the sway block supports. Accordingly, this invention is intended to embrace this and all other alternatives, modifications and variations which fall within the spirit and scope of the appended claims.

I claim:

1. A hitch guidance mechanism for an agricultural vehicle having a hitch assembly mounted on a frame of the vehicle, the hitch assembly having a pair of movable draft links for coupling to an implement, the hitch guidance mechanism characterized by:

a movable guidance unit comprising a pair of sway blocks and a movable plate having one end fixed to one of the pair of sway blocks and having a second end fixed to the other of the pair of sway blocks, each sway block being engageable with one of the pair of draft links, the plate and both sway blocks together forming a structure which is movable as a unit with respect to the frame;

support means for movably supporting the guidance unit adjacent to a rear end of the frame; and an actuator coupled between the frame and the guidance unit for controlling lateral movement of the guidance unit.

2. The invention of claim 1, wherein:
   the guidance unit is positioned between the draft links and immediately adjacent a rear end of the vehicle frame.

3. The invention of claim 1, wherein:
   the vehicle has a drawbar extending rearward therefrom; and the guidance unit has an open space through which extends the drawbar.

4. The invention of claim 1, wherein:
the vehicle has a laterally extending drawbar support member; and
a bracket rigidly couples the actuator to the frame, the bracket having a channel therein which slidably receives the drawbar support.

5. The invention of claim 1, wherein the support means comprises:
first and second laterally spaced-apart brackets attached to the frame; and
a pair of pivot arms, each pivot arm having a first end pivotally connected to one of the brackets and a second end pivotally connected to the guidance unit, the first ends of both arms being pivotal about axes which extend in a fore-and-aft direction with respect to the vehicle frame.

6. The invention of claim 5, wherein:
the guidance unit includes a space through which extends a drawbar of the vehicle.

7. The invention of claim 5, wherein:
the brackets are attached to a power take-off housing located at the rear of the vehicle and are positioned above and on opposite sides of a power take-off shaft which projects outwardly from the power take-off.

8. The invention of claim 1, wherein the guidance unit comprises:
a left sway block support;
a right sway block support;
the plate having ends connected to the sway block supports to maintain a fixed lateral spacing therebetween; and
adjustable connecting means for coupling each sway block support to a corresponding one of the sway blocks.

9. The invention of claim 8, wherein:
the actuator comprises a cylinder with a rod coupled to one of the sway block supports.

10. The invention of claim 8, further comprising:
an adjustable length rod having threaded ends received in threaded bores in the sway block supports.

11. The invention of claim 10, further comprising:
a guide support fixed to the frame and having a slot therein which slidably receives the adjustable length rod, the walls of the slot preventing for-and-aft movement of the rod and the guidance unit;
an upper link extending laterally and interconnecting upper ends of the sway blocks; and
a lower link extending laterally and interconnecting lower ends of the sway blocks.

12. A hitch guidance mechanism for an agricultural vehicle having a hitch assembly mounted on a frame of the vehicle, the hitch assembly having a pair of movable draft links for coupling to an implement, the hitch guidance mechanism characterized by:
first and second laterally spaced-apart brackets attached to the frame; and
a pair of pivot arms, each pivot arm having a first end pivotally connected to one of the brackets, the first ends of both arms being pivotal about axes which extend in a fore-and-aft direction with respect to the vehicle frame;
a pair of sway blocks, each sway block slidably engaging one of the draft links and each sway block being pivotally coupled to a second end of one of the pivot arms; and
an actuator coupled between the frame and one of the sway blocks for controlling lateral movement of the sway blocks.

13. A hitch guidance mechanism for an agricultural vehicle having a hitch assembly mounted on a frame of the vehicle, the hitch assembly having a pair of movable draft links for coupling to an implement, the hitch guidance mechanism characterized by:
a pair of sway blocks, each sway block slidably engaging one of the pair of draft links;
a left sway block support;
a right sway block support;
support means for movably supporting the sway block supports adjacent to a rear end of the frame;
a movable plate having ends connected to the sway block supports to maintain a fixed lateral spacing therebetween, the plate and the sway block supports being movable together as a unit with respect to the frame;
adjustably connecting means for coupling each sway block support to a corresponding one of the sway blocks; and
an actuator coupled between the frame and one of the sway block supports for controlling lateral movement of the sway block supports.

* * * * *

UNITED STATES PATENT AND TRADEMARK OFFICE
CERTIFICATE OF CORRECTION

PATENT NO. : 5,201,539

DATED : 13 April 1993

INVENTOR(S) : Robert L. Mayfield

It is certified that error appears in the above-identified patent and that said Letters Patent is hereby corrected as shown below:

In Col. 5, line 27, after "take-off", insert -- housing --.

In Col. 6, line 42, delete "adjustably" and insert -- adjustable --.

Signed and Sealed this

Fourteenth Day of December, 1993

*Attest:*

BRUCE LEHMAN

*Attesting Officer*    *Commissioner of Patents and Trademarks*